Figure 1:
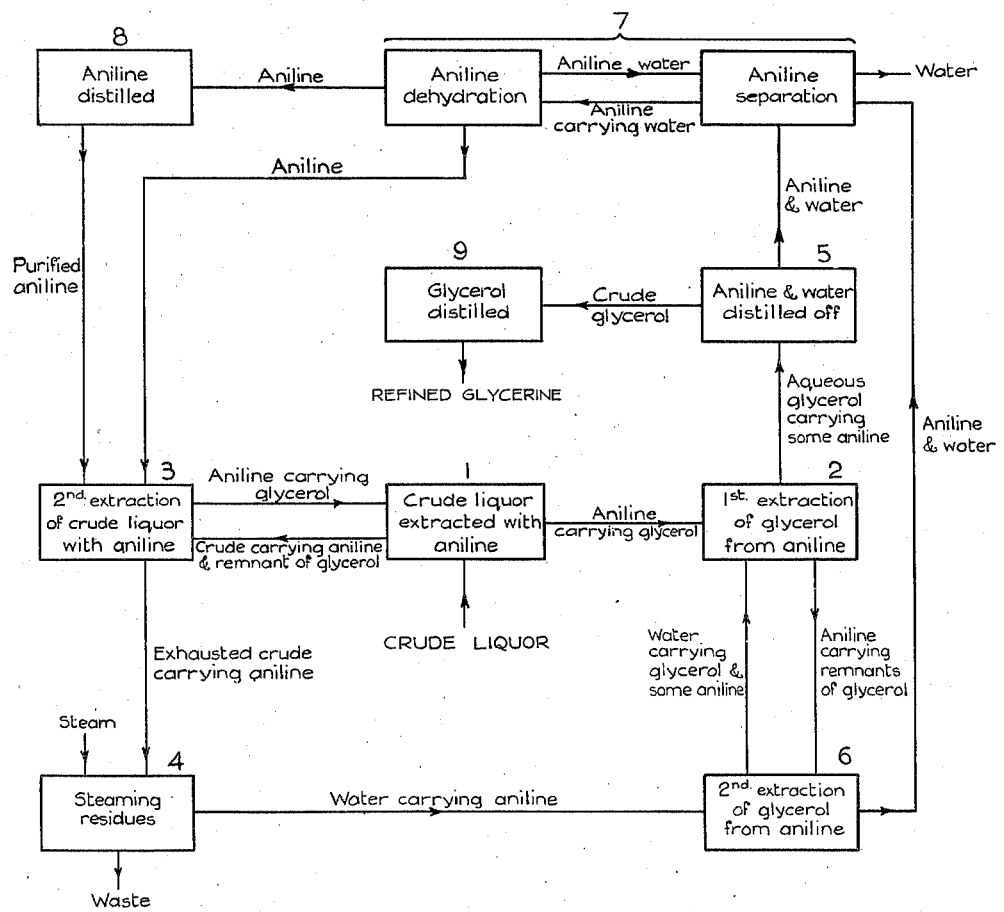

March 18, 1941.  R. A. WALMESLEY  2,235,056
PROCESS FOR THE RECOVERY OF GLYCEROL FROM STILL RESIDUES FROM
FERMENTATION PROCESSES
Filed March 4, 1939  2 Sheets-Sheet 1

Patented Mar. 18, 1941

2,235,056

UNITED STATES PATENT OFFICE 2,235,056

PROCESS FOR THE RECOVERY OF GLYCEROL FROM STILL RESIDUES FROM FERMENTATION PROCESSES

Robert Alan Walmesley, Ardrossan, Scotland, assignor to Imperial Chemical Industries Limited, a corporation of Great Britain Application March 4, 1939, Serial No. 259,807
In Great Britain March 4, 1938

REISSUED

5 Claims. (Cl. 260—637)

The present invention relates to the recovery of glycerol formed during the fermentation of carbohydrate material; and in particular to the recovery of glycerol present in the still residues obtained after highly volatile products, e. g. alcohol, acetone and acetaldehyde, have been distilled from the fermented carbohydrate material. In the following description and claims, the expression "still residues" is to be read as referring to such material.

As various carbohydrate materials are commonly used in fermentation processes, and as the manner of conducting these processes also varies widely, the crude still residues obtained from the different processes cover a wide range of compositions. In all cases, however, the residues contain a large proportion of non-volatile organic matter, chiefly unfermented and/or unfermentable carbohydrates; and in some cases considerable proportions of inorganic substances may also be present.

In addition to the carbohydrate impurities, the residues contain a certain proportion of so-called "acidic" impurities, which appear to consist mainly of phenolic and fatty acid derivatives. These acidic impurities produce undesirable effects in glycerol, and in fermentation glycerol they are present in such proportions that no sample of fermentation glycerol, however pure otherwise, will pass the specification tests applied in most countries to dynamite glycerine intended for use in the manufacture of explosives.

The nature or amount of the organic materials accompanying the glycerol in these still residues has hitherto prevented the successful recovery of the glycerol by the distillation methods which ordinarily serve for the purification of soap-lye or saponification crude glycerines. This is so, even where the material so distilled is not the crude still residue, but the involatile portion of an extract thereof in a volatile solvent for glycerol, e. g. industrial spirits or methyl alcohol, as already proposed for this purpose.

This invention has as an object to devise a new method of extracting glycerol from still residues. A further object is to devise such a method which will be more efficient and economical than previous methods. A still further object is to devise a method of separating glycerol from the materials that accompany it in still residues which will yield a glycerol which may be successfully refined by ordinary distillation processes to a purity suitable for explosives. Further objects will appear hereinafter. These objects are accomplished by the following invention.

I have found that I can recover the glycerol from still residues and from the impurities contained there if I include the step of extracting the glycerol-containing liquor, under conditions of low retention of water content, with a solvent for glycerol consisting essentially of a volatile nitrogen base that is substantially immiscible with water. I can further conveniently recover the glycerine by extracting the separated glycerine-containing base with water.

The basic nitrogenous solvents for glycerol that are suitable for use according to my invention include the primary aromatic amines such as aniline and its closely-related derivatives; for example, the toluidines, and their mixtures with aniline; and those heterocyclic nitrogenous bases which are not miscible with water but are solvents for glycerine, such as quinoline. The preferred solvent is aniline; and, of the toluidines, the para isomer is preferred to the others on account of its greater miscibility with glycerol.

The process of my invention may be applied either directly to a crude still residue; or to a liquor obtained by a preliminary extraction of still residues with a volatile solvent for glycerol, such as ethyl or methyl alcohol; or with a volatile heterocyclic nitrogen base which is miscible with water, such as pyridine, as described in my copending British application 8966/38; followed by distillation of the extract to recover the volatile solvent therefrom.

In putting my invention into effect, I may agitate either the suitably concentrated still residue or an evaporated extract thereof in a suitable vessel, preferably at a raised temperature, with an appropriate quantity of the base. As the presence of any considerable proportion of water in the residues is detrimental to the efficiency of the extraction and to the purity of the extracted glycerol, I prefer to reduce the water content of the residues, or of the preliminary extract, below 30% and preferably below 15% before or during the extraction with the basic solvent. However, reduction of the water content below 5% does not appear to cause further improvement.

The process may be applied to suitably dehydrated residues or extracts at ordinary temperatures; but, although a very pure product is obtainable in this way, the yield is low. I prefer to carry out the extraction at a temperature as high as the boiling point of the mixture permits; a temperature between 100° and 160° gives satisfactory results.

The quantity of nitrogenous basic solvent employed may be up to 50, or more, parts per part of glycerol present in the crude liquor; but the advantages of my invention are most strikingly evident when I use considerably smaller proportions of such a base in which glycerol is highly soluble. In such a case, a large proportion of the glycerol contained in the residues may be efficiently recovered in the form of a comparatively strong aqueous solution, e. g. in 20% concentration, when as little as 10–20 parts of basic solvent per part of glycerol are used.

When the solvent has been given sufficient time to extract the glycerol from the liquor, the mixture is allowed to settle. The solution of glycerol is then separated from the extracted liquor, cooled down to about atmospheric temperature, and agitated with a proportion of water sufficient to extract all the glycerol, e. g. 4-6 times the amount of glycerol in the extract. Instead of being immediately extracted with water, the glycerol-containing base may be used in a second extraction of crude liquor, or in a series of such extractions, e. g. in a countercurrent extraction process.

The aqueous glycerol solution obtained by extraction of the basic solvent with water may be concentrated by distillation, and suitably treated, e. g. by steam-distillation, to remove any solvent that may be retained in it. For some applications of the glycerol solution, such as the production of low-freezing fluids, the presence of traces of the solvent is not disadvantageous. The concentrated aqueous extract usually contains about 3% to 10% of its weight of involatile organic impurity and has a copper reduction value of about 1% only, calculated as invert sugar. It may be refined to 98%-99% concentration with satisfactorily low loss in a single distillation treatment as usually applied to soap lye or saponification crude glycerines.

The solvent separated from the aqueous extract is dried, suitably by distillation and recovery of an aqueous fraction. A number of extraction cycles may be carried out with the same quantity of basic solvent before the accumulation of acidic impurities in it renders complete redistillation necessary.

Figure 2:
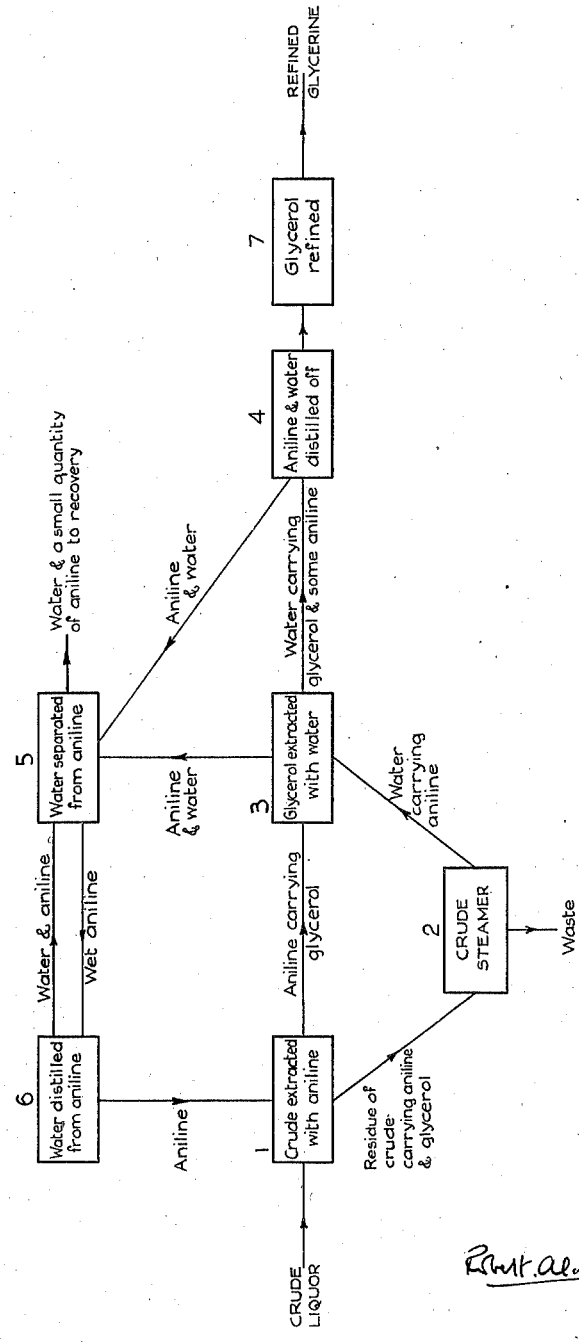

The invention is illustrated by the accompanying drawings, in which Figure 1 is a diagrammatic flow sheet showing a two-stage extraction process, and Figure 2 shows a single-stage process.

Referring to Figure 1, vessels 1 and 3 form a two-stage countercurrent extraction system. The crude liquor is fed to vessel 1, where it is extracted with aniline that has been already used in the final extraction stage in vessel 3, and from thence the crude passes to vessel 3 in which it is extracted with fresh aniline. This aniline extracts practically all the remaining glycerol in the crude, and passes with this glycerol into vessel 1. The exhausted crude in 3 is passed to waste through the steam still 4, from which the aniline which it contains is distilled off and recovered. The aniline phase carrying glycerol in solution passes to vessel 2, which with vessel 6 forms a two-stage countercurrent extraction system.

The aniline solution of glycerol coming from vessel 1 is cooled, and mixed in vessel 2 with water that has been already used for extraction in vessel 6. The mixture settles into a lower aniline phase containing a little water and glycerol, and an upper aqueous phase containing most of the glycerol and some aniline. The aniline phase passes to vessel 6, in which it undergoes a second extraction with the condensed aqueous distillate from vessel 4. The aqueous phase from vessel 6, containing the small quantity of glycerol extracted from the aniline phase, is used to extract the incoming aniline solution of glycerol in vessel 2. The exhausted wet aniline passes to vessels 7, in which it is dehydrated, first by mechanical separation of water and then by removal of an aqueous distillate. The dried aniline then passes to vessel 3, recommencing the cycle.

After circulating several times, the aniline becomes strongly contaminated with acidic impurities, and may be purified by total distillation in still 8. Alternatively, part of the circulating aniline may be continuously diverted to still 8, purified, and returned to circulation in vessel 3.

The aqueous phase from vessel 2 passes to vessel 5, in which it is concentrated by removal of the aniline and most of the water present. The distillate passes to vessels 7, and the concentrate passes to still 9, in which it is refined by vacuum distillation to give the final product.

In Figure 2, the crude liquor is extracted with aniline in vessel 1. The glycerol-bearing aniline phase is passed to vessel 3, and the extracted crude, which contains small quantities of aniline and glycerol, is passed to the steam still 2 where it is steamed to recover the aniline. The exhausted crude is then passed to waste. The condensate from vessel 2 is mixed in vessel 3 with a further quantity of water and the glycerol-bearing aniline, and the mixture is then permitted to settle into two layers.

The aqueous layer, containing the bulk of the glycerol and some aniline, is passed to still 4, in which the aniline and most of the water is distilled off, and the glycerol thereby concentrated. The concentrate is passed to still 7, in which it is refined by vacuum distillation.

The distillate from vessel 4 and the wet aniline phase from vessel 3 are passed to vessel 5 which, in conjunction with vessel 6, effects a dehydration of the aniline in the manner already described with reference to the process illustrated in Fig. 1. Part of the watery phase is diverted from vessel 5 and treated for the recovery of the aniline dissolved therein. The wet aniline is passed to still 6, where the water and some aniline is distilled off and returned to vessel 5, and the dried aniline is returned to circulation in vessel 1.

Where a high-boiling water-immiscible heterocyclic base, such as quinoline, is used in the extraction process, the process may be carried out in similar fashion.

The following examples, in which the parts mentioned are parts by weight, illustrate the use of aniline as the nitrogenous basic solvent according to the invention.

*Example 1*

This example illustrates a countercurrent extraction of glycerol from an evaporated extract of still residues, the form of apparatus being that of Figure 1.

An extract containing approximately 50% glycerol and 40% non-volatile impurities, obtained by removing the alcohol from an alcohol extract of a crude fermentation-glycerol still residue, is mixed with from 10 times its weight of substantially water-free aniline (which has been used previously for a second extraction of a similar batch of fermentation residue), in a jacketed vessel (vessel 1), provided with a thermometer, internal heating coils, mechanical stirring means and a condenser. The temperature of the mixture is raised to about 100°-110° C. The contents of the vessel are kept at this temperature and stirred until the rate of increase in the glycerol concentration of the aniline extract becomes small. The liquids are then allowed to separate, and the upper layer constituting the main aniline extract is withdrawn to vessel 2. The lower layer is subjected in vessel 3 to a further extraction with a fresh quantity of aniline, and, after separation of the weak extract thereby obtained, is steam-distilled in steam still 4 to recover the aniline retained in it. The main aniline extract is cooled and treated in vessel 2 with 4 parts water per part glycerol contained in the aniline extract; the water being used in the form of the weak aqueous solution obtained previously from a second aqueous extraction of a previous batch of the aniline extract. During the extraction of the aniline extract with the weak aqueous solution, the mixture is gently agitated. It is then allowed to settle and the two layers are separated.

The wet aniline layer, which still contains some glycerol, is passed to vessel 6, where it is gently agitated with a similar proportion of a saturated solution of aniline in water, suitably including the condensate from still 4.

The mixture in vessel 6 is allowed to settle into two layers, and the aqueous layer containing the residual glycerol is passed back to vessel 2 for use in the first extraction of incoming crude liquor. The wet aniline layer is passed to separation and dehydration vessels 7, where the water and aniline are separated. The dried aniline is passed to vessel 3, where it is utilised for a second extraction of singly-extracted crude liquor, and is then passed to vessel 1 where it recommences its cycle.

The aqueous glycerol layer from vessel 2 is passed to the concentrator 5, where the aniline and most of the water are distilled off and passed to the vessels 7. The concentrate is passed to still 9 for final refining by vacuum distillation.

The concentration of glycerol in the main aqueous extract is about 20%, and after concentration to 90% strength or over the extract may be refined to 98% to 99% glycerine in a single distillation.

*Example 2*

The procedure in this example is as given in Example 1, except that the extraction of the crude liquor with aniline is carried out at 120°–140° C. The aqueous glycerol obtained by concentration of the aqueous extract contains 91.1% glycerol, 1.9% ash, and 5.4% of residue not volatile at 160° C. Its copper reduction value, calculated as invert sugar, does not exceed 1%. It may be refined to 98–99% glycerol content by a single distillation. A redistillation of the refined glycerol gives a product that is suitable for use in the form of the nitric ester, in the manufacture of explosives.

*Example 3*

This example illustrates the use of the present invention in the treatment of crude still residues by a single-stage extraction process, using the arrangement of apparatus shown in Figure 2.

100 parts of evaporated crude residues (40 parts glycerol, 50 parts involatile residues, 10 parts water) are gently agitated with 800 parts dry aniline at a temperature between 150° and 180° C. in the apparatus described in Example 1 and shown as 1 in Figure 2. The mass is then allowed to settle, and the bottom layer of exhausted crude residues, containing about 6 parts of aniline and 4 parts of glycerol retained in the impurities, is drawn off to a separate vessel 2 and steamed to recover the aniline. The condensate is reutilised later in the process. The aniline layer, containing 36 parts glycerol and 6 parts impurity (chiefly phenolic and acidic bodies) is then cooled and passed to a vessel 3 in which it is agitated with sufficient water to form a 20% solution of glycerol with the glycerol dissolved in the aniline. For this purpose the aniline water condensed from the crude-steaming process may be used with the necessary proportion of feed water. When allowed to settle, the mixture separates into an aqueous aniline layer, in which the major portion of the phenolic and acidic impurities are retained, and an aqueous layer of 20% glycerol, containing about 6% to 7% impurity on the weight of glycerol and about 3% of its total weight of aniline. The aqueous aniline, which contains about 5% of this weight of water, is dried by partial separation and distillation in 5 and 6; and may be used for the extraction of several more batches of crude residues before the accumulation of impurities necessitates its complete redistillation.

The aqueous glycerine is concentrated in still 4 at ordinary pressure, during which the aniline water distilled off is collected and treated for the recovery of the aniline. The concentrate, consisting of 80% glycerol with about 20% involatile impurity, is then refined by a vacuum distillation, in still 7, to 98% to 99% concentration. The refined glycerol so obtained, when once redistilled, is suitable for use in the manufacture of explosives.

The following tables show the results of analysis of the input and output of each vessel during a run, each table having the same number as is given to the apparatus to which it refers in Figure 2. The heading "Tar" refers to the collected inorganic and organic involatile impurities in the crude liquor.

|  | Aniline | Glycerol | Tar | Water | Total |
|---|---|---|---|---|---|
| **I. *Crude extraction*** | | | | | |
| *in* | | | | | |
| Crude still residues | | 80 | 100 | 20 | 200 |
| Dry aniline (from VI) | 1600 | | | | 1600 |
| | 1600 | 80 | 100 | 20 | 1800 |
| *out* | | | | | |
| To crude steaming (II) | 12 | 8 | 88 | 2 | 110 |
| To glycerol extraction (III) | 1588 | 72 | 12 | 18 | 1690 |
| | 1600 | 80 | 100 | 20 | 1800 |
| **II. *Crude steaming*** | | | | | |
| *in* | | | | | |
| Extracted crude (from I) | 12 | 8 | 88 | 2 | 110 |
| Steam | | | | 250 | 250 |
| | 12 | 8 | 88 | 252 | 360 |
| *out* | | | | | |
| To glycerol extraction (III) | 11 | | | 200 | 211 |
| To waste | 1 | 8 | 88 | 52 | 149 |
| | 12 | 8 | 88 | 252 | 360 |
| **III. *Glycerol extraction*** | | | | | |
| *in* | | | | | |
| Aniline solution (from I) | 1588 | 72 | 12 | 18 | 1690 |
| Aniline water (from II) | 11 | | | 200 | 211 |
| Feed water | | | | 135 | 135 |
| | 1599 | 72 | 12 | 353 | 2036 |
| *out* | | | | | |
| To glycerol concentration (IV) | 11 | 72 | 4 | 273 | 360 |
| To aniline separator (V) | 1588 | | 8 | 80 | 1676 |
| | 1599 | 72 | 12 | 353 | 2036 |
| **IV. *Glycerol concentration*** | | | | | |
| *in* | | | | | |
| Aqueous glycerol (from III) | 11 | 72 | 4 | 273 | 360 |
| *out* | | | | | |
| Product glycerol | | 72 | 4 | 18 | 94 |
| Aniline water to separator (V) | 11 | | | 196 | 207 |
| Evaporated | | | | 59 | 59 |
| | 11 | 72 | 4 | 273 | 360 |

|  | Aniline | Glycerol | Tar | Water | Total |
|---|---|---|---|---|---|
| V. Aniline separation | | | | | |
| *in* | | | | | |
| From glycerol extraction (III) | 1588 |  | 8 | 80 | 1676 |
| From glycerol concentration (IV) | 11 |  |  | 196 | 207 |
| From aniline still (VI) | 20 |  |  | 84 | 104 |
|  | 1619 |  | 8 | 360 | 1987 |
| *out* | | | | | |
| Wet aniline to still (VI) | 1610 |  | 8 | 84 | 1702 |
| Aniline water to recovery | 9 |  |  | 276 | 285 |
|  | 1619 |  | 8 | 360 | 1987 |
| VI. Aniline dehydration | | | | | |
| *in* | | | | | |
| Wet aniline (from V) | 1610 |  | 8 | 84 | 1702 |
| *out* | | | | | |
| Distillate to separation (V) | 20 |  |  | 84 | 104 |
| Dry aniline to extractor (I) | 1590 |  | 8 |  | 1598 |
|  | 1610 |  | 8 | 84 | 1702 |

Example 4

This example illustrates the use of a high-boiling water-insoluble heterocyclic base. 20 parts by weight of an evaporated extract containing 40% glycerol, 40% impurities and 20% water, are extracted with 100 parts of quinoline at a temperature between 180 and 200° C. The quinoline extract is separated, cooled and treated with sufficient water to form a 5% solution of glycerol. A single quinoline extraction removes about 25% of the glycerol in the crude liquor. On evaporation, the aqueous extract leaves a residue of pale yellow glycerol of high quality, having a total residue of 3.2% at 160° C.

Example 5

A fermentation liquor concentrate containing 14% glycerine and 64% total non-volatile impurity, is extracted with pyridine by the method of my copending British application No. 8966/38, namely it is agitated at ordinary temperature with one and a half times its volume (about equal weight) of commercial pyridine added in portions. After thorough admixture, the mixture is allowed to separate, and the upper layer consisting of the pyridine extract is decanted. The residue is mixed and extracted with a second portion of pyridine, the amount used being the same as in the first extraction. The two extracts are transferred to a still arranged for indirect heating with superheated steam, and the liquor is distilled until the distillate is free from water. The liquor is then decanted from impurities and the remainder of the pyridine distilled from it. The residue, consisting of a crude glycerol containing about 20% total residue at 160° C. is mixed with ten times its weight of aniline. The mixture is then mixed with sufficient water to form a 20% solution of glycerol. The aqueous glycerol so obtained may be concentrated in the ordinary manner to give a crude glycerol having less than 5% total residue at 160° C. and capable of refinement to 98%–99% refined glycerol grade in a single distillation.

Instead of the aniline I could have used in the above examples quinoline, p-toluidine, m-toluidine, o-toluidine, or a solution of either p- or o-toluidine in aniline.

Instead of separating the glycerol from the volatile nitrogen containing base by extracting with water I could separate it by distillation.

This invention is a valuable advance in the art enabling the glycerol to be extracted from the crude liquor in an economical manner, without waste either of the product or of the organic base and to be refined to 99% purity with only one distillation.

As many apparently widely different embodiments of this invention may be made without departing from the spirit and scope thereof, it is to be understood that the invention is not limited to the specific embodiments thereof except as defined in the appended claims.

I claim:

1. A process for the recovery of glycerol from still residues which comprises the step of extracting the glycerol-containing liquor with a solvent selected from the group consisting of aniline, the toluidines, and quinoline, and recovering the dissolved glycerol by treating with cold water.

2. A process as claimed in claim 1 which is followed by the step of extracting the glycerol from the liquid nitrogen base with water, both extractions being effected by a counter-current process.

3. The process for the recovery of glycerol from still residues which comprises extracting the glycerol-containing liquor with a solvent selected from the group consisting of aniline, the toluidines and quinoline, evaporating the extract to a water content below 30%, cooling and extracting the glycerol with water.

4. The process for the recovery of glycerol from still residues which comprises extracting the glycerol-containing liquor at a temperature above 100° C. with a solvent selected from the group consisting of aniline, the toluidines, and quinoline, cooling and extracting the glycerol with water.

5. The process for the recovery of glycerol from still residues which comprises extracting glycerol-containing liquor with a cold water-immiscible primary aromatic amine.

ROBERT ALAN WALMESLEY.